(12) United States Patent
Hanif

(10) Patent No.: US 8,358,576 B2
(45) Date of Patent: Jan. 22, 2013

(54) TECHNIQUES FOR DETERMINING LOCAL REPAIR PATHS USING CSPF

(75) Inventor: Mohammad Hanif, Pleasanton, CA (US)

(73) Assignee: Foundry Networks, LLC, San Jose, CA (US)

( * ) Notice: Subject to any disclaimer, the term of this patent is extended or adjusted under 35 U.S.C. 154(b) by 425 days.

(21) Appl. No.: 11/866,861

(22) Filed: Oct. 3, 2007

(65) Prior Publication Data

US 2010/0106999 A1 Apr. 29, 2010

(51) Int. Cl.
*G01R 31/08* (2006.01)
(52) U.S. Cl. ......... 370/216; 370/217; 370/218; 370/225
(58) Field of Classification Search .................. 370/238, 370/237, 216–218, 225; 709/223
See application file for complete search history.

(56) References Cited

U.S. PATENT DOCUMENTS

| | | | |
|---|---|---|---|
| 5,251,205 A | 10/1993 | Callon et al. |
| 6,311,288 B1 | 10/2001 | Heeren et al. |
| 6,628,649 B1 | 9/2003 | Raj et al. |
| 6,697,329 B1 | 2/2004 | McAllister et al. |
| 6,711,152 B1 | 3/2004 | Kalmanek, Jr. et al. |
| 6,813,242 B1 | 11/2004 | Haskin et al. |
| 6,882,647 B2 | 4/2005 | McAllister et al. |
| 6,895,441 B1 | 5/2005 | Shabtay et al. |
| 6,904,018 B2 | 6/2005 | Lee et al. |
| 6,914,912 B1 | 7/2005 | Skalecki et al. |
| 6,982,951 B2 | 1/2006 | Doverspike et al. |
| 6,987,727 B2 | 1/2006 | Fredette et al. |
| 7,058,845 B2 | 6/2006 | Fujita |
| 7,088,679 B2 | 8/2006 | Behzadi |
| 7,093,027 B1 | 8/2006 | Shabtay et al. |
| 7,120,118 B2 | 10/2006 | Rajagopal et al. |
| 7,133,358 B2 | 11/2006 | Kano |
| 7,164,652 B2 | 1/2007 | Puppa et al. |
| 7,180,866 B1 | 2/2007 | Chartre et al. |
| 7,209,434 B2 | 4/2007 | Kano et al. |
| 7,230,913 B1 | 6/2007 | Vasseur et al. |

(Continued)

FOREIGN PATENT DOCUMENTS

WO WO 03/071745 A1 * 8/2003

OTHER PUBLICATIONS

U.S. Appl. No. 11/833,167, filed Aug. 2, 2007, Bhat et al.

(Continued)

*Primary Examiner* — Mark Rinehart
*Assistant Examiner* — Gbemileke Onamuti
(74) *Attorney, Agent, or Firm* — Kilpatrick Townsend & Stockton LLP

(57) ABSTRACT

Techniques for computing a path for a local repair connection to be used to protect a connection traversing an original path from an ingress node to an egress node. The computed path originates at a node (start node) in the original path and terminates at another node (end node) in the original path that is downstream from the start node. A Constraint Shortest Path First (CSPF) algorithm may be used to compute the path. The computed path is such that it satisfies one or more constraints and does not traverse a path from a first node in the original path to a second node in the original path, wherein the first and second nodes are upstream from the start node in the original path and the second node is downstream from the first node in the original path. A local repair connection may then be signaled using the computed path.

23 Claims, 3 Drawing Sheets

U.S. PATENT DOCUMENTS

| | | | |
|---|---|---|---|
| 7,233,569 | B1 | 6/2007 | Swallow |
| 7,586,841 | B2 * | 9/2009 | Vasseur .................. 370/218 |
| 7,675,860 | B2 * | 3/2010 | Vasseur et al. ............ 370/237 |
| 8,040,792 | B2 | 10/2011 | Hanif et al. |
| 2002/0112072 | A1 | 8/2002 | Jain |
| 2003/0063613 | A1 | 4/2003 | Carpini et al. |
| 2003/0090995 | A1 | 5/2003 | Illikkal et al. |
| 2004/0004938 | A1 * | 1/2004 | Buddhikot et al. ......... 370/238 |
| 2004/0109687 | A1 | 6/2004 | Park et al. |
| 2005/0088965 | A1 | 4/2005 | Atlas et al. |
| 2005/0094554 | A1 | 5/2005 | Nakash |
| 2005/0188100 | A1 | 8/2005 | Le Roux et al. |
| 2006/0067217 | A1 | 3/2006 | Li et al. |
| 2006/0146696 | A1 | 7/2006 | Li et al. |
| 2006/0171316 | A1 | 8/2006 | El-Sakkout et al. |
| 2006/0171320 | A1 | 8/2006 | Vasseur et al. |
| 2007/0011284 | A1 * | 1/2007 | Le Roux et al. ............ 709/223 |
| 2007/0038767 | A1 | 2/2007 | Miles et al. |
| 2007/0070883 | A1 | 3/2007 | Lysne et al. |
| 2007/0091795 | A1 | 4/2007 | Bonaventure et al. |
| 2007/0165515 | A1 | 7/2007 | Vasseur |
| 2007/0174483 | A1 | 7/2007 | Raj et al. |
| 2007/0177506 | A1 | 8/2007 | Singer et al. |
| 2008/0049622 | A1 | 2/2008 | Previdi et al. |
| 2008/0219153 | A1 | 9/2008 | Shand et al. |
| 2008/0253281 | A1 | 10/2008 | Li et al. |
| 2009/0292942 | A1 | 11/2009 | Bhat et al. |
| 2009/0292943 | A1 | 11/2009 | Hanif et al. |

OTHER PUBLICATIONS

U.S. Appl. No. 11/833,168, filed Aug. 2, 2007, Hanif et al.

Le Roux, et al., "P2MP MPLS-TE Fast Reroute with P2MP Bypass Tunnels," draft-ietf-mpls-p2mp-te-bypass-01.txt, Jul. 2007 (14 pages).

Cetin, et al., "Multiprotocol Label Switching (MPLS) Traffic Engineering management Information Base for Fast Reroute," draft-ietf-mpls-fastreroute-mib-07.txt, Mar. 2007 (35 pages).

Pan et al., RFC 4090: "Fast Reroute Extensions to RSVP-TE for LSP Tunnels," May 2005 (36 pages).

"Dijkstra's Shortest Path Algorithm in Java," printed from website http://renaud.waldura.com/doc/java/dijkstra, on Jul. 13, 2007 (12 pages).

Non-Final Office Action for U.S. Appl. No. 11/833,168, mailed on Dec. 8, 2009, 28 pages.

Non-Final Office Action for U.S. Appl. No. 11/833,167, mailed Jun. 24, 2009, 13 pages.

Non-Final Office Action for U.S. Appl. No. 11/833,168, mailed May 13, 2009, 25 pages.

Final Office Action for U.S. Appl. No. 11/833,167, mailed on Feb. 7, 2011, 22 pages.

Non-Final Office Action for U.S. Appl. No. 11/833,168, mailed on Feb. 1, 2011, 32 pages.

Advisory Action for U.S. Appl. No. 11/833,168, mailed on Sep. 28, 2010, 8 pages.

Notice of Allowance for U.S. Appl. No. 11/833,168, mailed on Jul. 8, 2011, 11 pages.

Non-Final Office Action for U.S. Appl. No. 11/833,167, mailed on Mar. 28, 2012, 21 pages.

Non-Final Office Action for U.S. Appl. No. 11/833,167, mailed on Feb. 3, 2010, 20 pages.

Final Office Action for U.S. Appl. No. 11/833,168, mailed on Jul. 9, 2010, 30 pages.

Final Office Action for U.S. Appl. No. 11/833,167 mailed Aug. 23, 2012, 16 pages.

Wang, et el. "Shortest Path First with Emergency Exits", Department of Computer Science, University College London, ACM SIGCOMM Computer Communication Review, vol. 20, Issue 4, Sep. 1990, pp. 166-176, 11 pages.

* cited by examiner

TECHNIQUES FOR DETERMINING LOCAL REPAIR PATHS USING CSPF

CROSS-REFERENCES TO RELATED APPLICATIONS

The present application herein incorporates by reference for all purposes the entire contents of:

(1) U.S. application Ser. No. 11/833,167 titled TECHNIQUES FOR DETERMINING OPTIMIZED LOCAL REPAIR PATHS filed Aug. 2, 2007; now U.S. Publication No. US 2009/0292942, published Nov. 26, 2009; and (2) U.S. application Ser. No. 11/833,168 titled TECHNIQUES FOR DETERMINING LOCAL REPAIR CONNECTIONS filed Aug. 2, 2007, now U.S. Pat. No. 8,040,792, issued Oct. 18, 2011.

BACKGROUND OF THE INVENTION

The present application relates to networking and more particularly to techniques for determining a local repair path using Constraint Shortest Path First (CSPF) techniques.

Connection-oriented protocols are widely used to transport data across computer networks. In a connection-oriented protocol, a connection is set up between two endpoints in a network, usually prior to data transmission. Nodes or network devices at the end points of a connection use a preliminary protocol to establish an end-to-end path traversed by the connection before any data is sent. A connection is then signaled using the established path. The preconfigured connection with its associated path is then used to transport data between the end points. The first network device in the path is referred to as an ingress network device (e.g., an ingress router) and the last network device in the path is referred to as an egress network device (e.g., an egress router). Examples of connection-oriented mechanisms include circuit switching protocols such as Asynchronous Transfer Mode (ATM) protocol, frame relay, Multi-Protocol Label Switching (MPLS), and others.

Multi-Protocol Label Switching (MPLS) (also referred to as "tag switching" or "label switching" protocol) is a data-carrying mechanism which emulates some properties of a circuit-switched network over a packet-switched network. It was designed to provide a unified data-carrying service for both circuit-based clients and packet-switching clients which provide a datagram service model. It can be used to carry many different kinds of traffic, including IP packets, as well as native ATM, SONET, and Ethernet frames. In MPLS, a connection between two end points is referred to as a Label Switched Path (LSP). Various signaling protocols such as Label Distribution Protocol (LDP), Resource Reservation Protocol—Traffic Engine (RSVP-TE), Constraint-based Routed LDP (CR-LDP) and others may be used to set up an LSP. Routers in an MPLS LSP are referred to as Label Switching Routers (LSRs). The first router in an LSP is referred to as an ingress edge router and the last router in an LSP is referred to as the egress edge router. Routers in between the ingress router and the egress router are referred to as transit LSRs. LSPs are unidirectional and enable a packet to be label switched through the MPLS network from one endpoint to another.

A connection, such as an LSP in an MPLS network, may experience data transmission disruptions due to failures of one or more nodes and/or links in the path traversed by the connection. In order to safeguard against such disruptions along the original preconfigured connection, one or more alternate connections are generally computed for the original connection that enable failure points (e.g., failed links or nodes) along the path of the original connection to be bypassed. These alternate connections are referred to as "local repair connections". Each local repair connection has an associated path (referred to as a local repair path) that originates at a start node in the path associated with the original connection and ends at an end node in the path associated with the original connection that is downstream from the start node. Different protocols may use different techniques to set up and maintain local repair connections. For example, for MPLS, RFC 4090 describes techniques to establish local repair LSPs (e.g., backup LSPs or detour LSPs) for local repair of LSP tunnels.

A connection is said to be protected if at least one local repair connection has been set up for that connection. A node or link in a connection is said to be protected if at least one local repair connection has been configured that does not use that node or link.

Various different techniques may be used for determining a path for a local repair connection. For example, Constraint Shortest Path First (CSPF) techniques may be used to determine a path for a local repair connection. CSPF is a type of shortest path first algorithm that computes an optimal path from a start node to an end node satisfying a set of constraints. The constraints may include end-to-end delay, maximum numbers of links/nodes traversed, maximum bandwidth required per link, costs associated with the links, and the like. An example of a CSPF technique is the Dijkstra algorithm. CSPF is widely used in MPLS. The path computed using CSPF may be the same as the path computed using a shortest path first algorithm (without constraints) or may be completely different depending on the constraints to be satisfied.

Improved techniques are desired for computing paths for local repair connections using CSPF or CSPF-like techniques.

BRIEF SUMMARY OF THE INVENTION

Embodiments of the present invention provide improved techniques for computing a path for a local repair connection to be used to protect a connection traversing an original path from an ingress node to an egress node. The computed path originates at a node (start node) in the original path and terminates at another node (end node) in the original path that is downstream from the start node. A Constraint Shortest Path First (CSPF) algorithm may be used to compute the path. The computed path is such that it satisfies one or more constraints and does not traverse a path from a first node in the original path to a second node in the original path, wherein the first and second nodes are upstream from the start node in the original path and the second node is downstream from the first node in the original path. A local repair connection may then be signaled using the computed path.

According to an embodiment of the present invention, techniques are provided for determining a local repair path for a connection where the connection has a first path traversing a plurality of nodes from an ingress node to an egress node. A start node and an end node are identified from the plurality of nodes, where the end node is downstream to the start node in the first path. A second path is then determined from the start node to the end node such that the second path satisfies one or more constraints and the second path does not traverse a path from a first node in the plurality of nodes to a second node in the plurality of nodes wherein the first node and second nodes are upstream from the start node in the first path and the second node is downstream from the first node in the first path. A local repair connection may be signaled using the second path. In one embodiment, the end node is at least two nodes downstream from the start node in the first path.

According to an embodiment of the present invention, a constraint shortest path first (CSPF) technique may be used to determine the second path.

In one embodiment, the processing for determining the second path may comprise identifying a first list of nodes comprising all nodes in the first path that are upstream from the start node, determining if a first candidate node identified for inclusion in the second path is included in a second list of nodes, rejecting the first candidate node as a node for the second path upon determining that the first candidate node is included in the second list of nodes, and including the first candidate node as a node in the second path upon determining that the first candidate node is not included in the second list of nodes.

In one embodiment, determining the second path further may comprise, upon determining that the first candidate node is not included in the second list of nodes, determining if the first candidate node is included in the first list. If the first candidate node is included in the first list, a set of nodes in the first list is identified comprising nodes that are downstream from the first candidate node in the first path. The first list is updated to not contain the set of nodes and the second list is updated to include the set of nodes.

In one embodiment, determining the second path may further comprise determining if a second candidate node identified for inclusion in the second path is included in the updated second list of nodes, rejecting the second candidate node as a node for the second path upon determining that the second candidate node is included in the updated second list of nodes, and including the second candidate node as a node in the second path upon determining that the second candidate node is not included in the updated second list of nodes.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
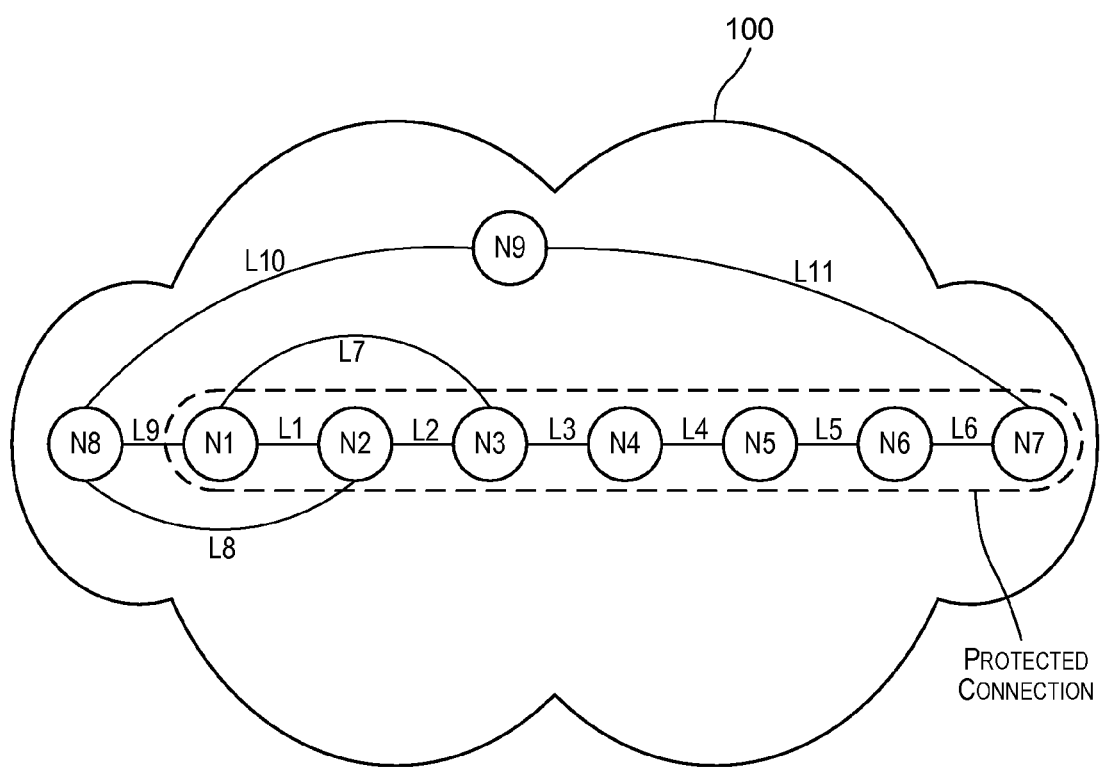
FIG. 1 is a simplified diagram of a network that may incorporate an embodiment of the present invention.

FIG. 1 is a simplified diagram of a network 100 that may incorporate an embodiment of the present invention. Network 100 may comprise multiple nodes or network devices and links connecting the nodes. The nodes in FIG. 1 are identified as N<number> and links between the nodes are identified by L<number>. A node may be any device that is capable of forwarding data such as a switch, a router, etc. A link may be a physical wire connecting two nodes or a wireless link. Links may have different capacities such as 10/100 megabits-per-second (Mbps), 1 gigabit-per-second (Gbps), 10 Gbps, and so on. The links may be unidirectional or bidirectional.

Network 100 may be capable of transmitting data using a connection-oriented protocol, a connectionless protocol, or other types of protocols. For purposes of explaining the features of an embodiment of the present invention, it is assumed that a connection is used to communicate data from node N1 to node N7. The connection may have an associated path comprising nodes and links from N1 to N7: N1-L1-N2-L2-N3-L3-N4-L4-N5-L5-N6-L6-N7. Node N1 is the ingress node for the connection and node N7 is the egress node for the connection. The connection between nodes N1 and N7 may be set up prior to transmission of data from N1 to N7 using the connection. The nodes or network devices at the end points of a connection, i.e., nodes N1 and N7, may use a preliminary protocol to establish an end-to-end connection between the end points before any data is sent. The preconfigured connection is then used to transport data between the end points.

Various different connection-oriented mechanisms such as Asynchronous Transfer Mode (ATM) protocol, frame relay, Multi-Protocol Label Switching (MPLS), and others may be used to set up the connection from N1 to N7 depicted in FIG. 1. For example, the MPLS protocol may be used to establish an LSP between nodes N1 and N7 having an associated path N1-L1-N2-L2-N3-L3-N4-L4-N5-L5-N6-L6-N7. The LSP carries data traffic from ingress node N1 to egress node N7 via link L1, LSR N2, link L2, LSR N3, link L3, LSR N4, link L4, LSR N5, link L5, LSR N6, and link L6. In MPLS, an LSP is unidirectional and starts at ingress node N1 and ends at an egress node N7. This implies that data flows along the LSP only in one direction from an ingress or originating node to the egress or destination node. A separate LSP has to be set up for transmitting data in the opposite direction.

Different algorithms may be used to determine a path from the ingress node to the egress node such as Shortest Path First (SPF) algorithms, Constraint Shortest Path First (CSPF) algorithms, and others. For example, in the example depicted in FIG. 1, the connection between nodes N1 and N7 may be set up using a CSPF algorithm and satisfying one or more constraints such as bandwidth, cost, and the like. Once a connection has been set up, the connection may be used to transmit data from the ingress node to the egress node (in FIG. 1 from N1 to N7) along the preconfigured path associated with the connection. The egress node may then transmit the data to another device or network.

One or more local repair connections may be set up to protect a preconfigured connection in order to safeguard against network outages or disruptions that may be caused by failure of one or more links and/or nodes in the preconfigured connection. For example, a local repair connection may be established for the preconfigured connection from N1 to N7 depicted in FIG. 1. The connection for which one or more local repair connections are configured is referred to as a protected connection. The path traversed by a protected connection is referred to as the original path or OPATH. Accordingly, for the example depicted in FIG. 1, the OPATH is N1-L1-N2-L2-N3-L3-N4-L4-N5-L5-N6-L6-N7. A node or link in the OPATH associated with a protected connection is considered protected if a local repair connection exists that enables traffic to be routed such that the traffic bypasses the node or link. The path traversed by a local repair connection is referred to as a local repair path or LPATH.

An LPATH starts or originates at a node (start node) in the OPATH and terminates at another node (end node) in the OPATH that is downstream from the start node of the LPATH. The LPATH does not comprise at least the next-hop link to the start node in the OPATH. For a connection, a first node is considered to be upstream to a second node if traffic flows from the first node to the second node. There may be zero or more intermediate nodes between the first node and the second node. The second node is considered to be downstream to the first node if traffic flows from the first node to the second node. The LPATH for a local repair connection may comprise zero or more nodes that are not included in the OPATH associated with the protected connection.

The start node of a local repair connection (i.e. the first node in the LPATH associated with the local repair connection) is referred to as a Point of Local Repair (PLR) node. The PLR is a node in the OPATH of the protected connection where the local repair connection originates. The end node of a local repair connection is a node where the local repair connection rejoins the original protected connection. This end node is known as the merge point (MP) node. A merge point node is always some node that is downstream to the PLR in the OPATH.

A local repair connection may be configured to protect one or more nodes or links in the OPATH associated with a protected connection. A local repair connection protecting a node or link in the OPATH has an associated LPATH that starts at a node in the OPATH that is upstream from the node or link to be protected and merges back with a node in the OPATH that is downstream from the node or link to be protected. In this manner, the local repair connection enables traffic to be routed around the protected node or link. In the event of a failure of a node or link, a local repair connection protecting that node or link enables traffic to be rerouted from a node (the PLR) upstream of the network failure to a node (merge point node) downstream from the failure at which point the rerouted traffic is merged back to the OPATH.

Local repair connections (e.g., local repair LSPs) for a protected connection (e.g., a protected LSP) may be set up in advance before the protected connection is used to transmit data. Local repair connections may also be set up dynamically as new protected connections are signaled. Advance setup of local repair connections is typically done in applications where the data has to be forwarded within certain specified time limits. In such applications (e.g., for voice over IP applications), the computing and signaling of local repair connections is done in advance such that the traffic can be redirected, if needed, onto the local repair connection within a specified time limit without having to spend time in creating the local repair connection after the occurrence of a network failure.

Various different techniques may be used to configure a local repair connection for a protected connection. Typically, an LPATH is first determined that traverses from a PLR node to a merge point node where the PLR node and the merge point node are nodes in the OPATH associated with the protected connection and the merge point node is downstream from the PLR node in the OPATH. A local repair connection is then signaled using the LPATH.

As described in U.S. application Ser. Nos. 11/833,167 and 11/833,168, as part of the processing for determining an LPATH, after a PLR node has been identified, an attempt is made to find a path from the PLR node to the next-next-hop node downstream to the PLR node in the OPATH associated with the protected connection that avoids the next-hop node and the next-hop link from the PLR node in the OPATH. A next-next-hop node to the PLR node is a node in the OPATH that is two hops downstream (also referred to as two nodes downstream) from the PLR node in the OPATH. A next-hop node to the PLR node is a node in the OPATH that is one hop downstream (also referred to as one node downstream) from the PLR node in the OPATH. A next-hop link to the PLR node is a link that is connected to the PLR and to a node downstream from the PLR node in the OPATH. For example, for the network depicted in FIG. 1, if node N4 is the PLR node, then node N6 is the next-next-hop node to node N4, node N5 is the next-hop node to node N4, and link L4 is the next-hop link to node N4. Accordingly, in order to establish an LPATH for a local repair connection starting at PLR node N4, an attempt is first made to find a path from node N4 to node N6 that avoids N5 and L4.

If a path from the PLR node to the next-next-hop node downstream to the PLR node in the OPATH associated with the protected connection that avoids the next-hop node and the next-hop link from the PLR node cannot be found, then an attempt is made to determine a path from the PLR node to the next-hop node downstream to the PLR in the OPATH that avoids the next-hop link to the PLR node in the OPATH. For example, for the network depicted in FIG. 1, if node N4 is the PLR node, an attempt is made to find a path from node N4 to node N5 that avoids link L4. If such a path cannot be found then attempts are made to find a path from the PLR node to other nodes in the OPATH that are downstream from the next-next-hop node to the PLR node and avoids the next-hop link to the PLR. For example, for the network depicted in FIG. 1, an attempt is made to find a path from node N4 to node N7 that avoids link L4.

Different techniques may be used to determine a path from a PLR node to some merge point node, where the merge point node may be the next-hop node to the PLR in the OPATH or some other node in the OPATH that is downstream from the next-hop node to the PLR node. In one embodiment, the path is determined using a CSPF technique. A CSPF technique is a technique that finds an optimal path between two nodes that satisfies a set of constraints. The path computed by a CSPF technique may be the same as the path computed using a shortest path first algorithm (without constraints) or may be completely different depending on the constraints to be satisfied. An example of a CSPF technique is the Dijkstra algorithm.

According to an embodiment of the present invention, the CSPF technique is improved such that the LPATH that is determined between a PLR node and a merge point node does not traverse from a first node in the OPATH that is upstream to the PLR node in the OPATH to a second node in the OPATH that is also upstream to the PLR node in the OPATH but downstream from the first node in the OPATH. For example, for the connection from node N1 to N7 depicted in FIG. 1, if node N4 is the PLR node, then the path determined from N4 to some merge point node does not traverse from node N2 to N3, or node N1 to N3, and the like.

Figure 2:
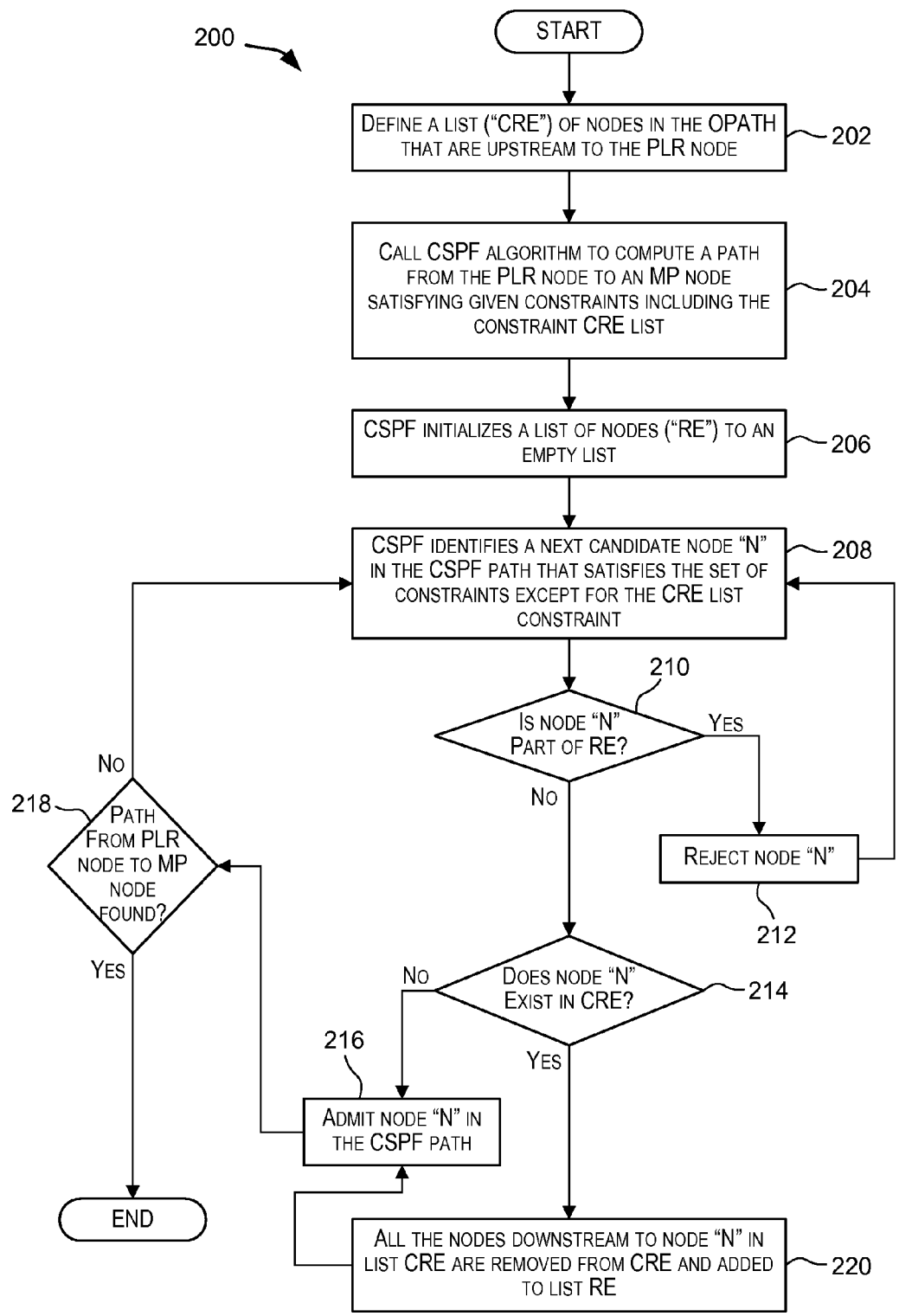
FIG. 2 depicts a simplified flowchart showing a method for determining a path from a PLR node to a merge point node using an enhanced CSPF technique according to an embodiment of the present invention.

FIG. 2 depicts a simplified flowchart 200 showing a method for determining a path from a PLR node to a merge point node using an enhanced CSPF technique according to an embodiment of the present invention. The processing depicted in FIG. 2 may be performed by software modules (e.g., code or instructions executed by a processor), hardware modules, or combinations thereof. In one embodiment, the processing is performed by the PLR node. The processing may also be performed by other nodes or systems or devices. The merge point node may be the next-hop node downstream from the PLR node in the OPATH, a next-next-hop downstream to the PLR node in the OPATH or some other node downstream from the PLR node in the OPATH. The computed LPATH generally does not include the next-hop link to the PLR node in the OPATH.

In one embodiment, information identifying the PLR node and the merge point node may be provided. Alternatively, the processing system may be configured to determine the PLR node and the merge point node. For example, for a node to be protected, the PLR node may be determined to be a node in the OPATH that is upstream to the node to be protected and the merge point node may be determined to be a node downstream from the protected node in the OPATH. For a node that has experienced a network failure, the PLR node may be determined to be a node in the OPATH that is upstream to the failed node and the merge point node may be determined to be a node in the OPATH that is downstream from the failed node. Other techniques may also be used to identify PLR and merge point nodes.

As depicted in FIG. 2, a list of all nodes in the OPATH that are upstream from the PLR node are identified (step 202). The list of nodes identified in 202 may be referred to as the Constraint Reverse Exclude ("CRE") list. For example, in an MPLS network, the CRE list comprises all LSRs upstream from the PLR node in the OPATH including the ingress router. Accordingly, list CRE comprises nodes in the OPATH from the ingress node to a node that is upstream from the PLR node. For example, for the connection N1 to N7 depicted in FIG. 1, if node N4 is assumed to be the PLR node, then CRE comprises {N1, N2, N3}. The ordering of the nodes in the OPATH is also maintained in the CRE list.

A CSPF algorithm is then called to compute a path from the PLR node to the merge point node that satisfies a set of constraints including the constraint list CRE (step 204). Accordingly, the CRE list is also provided as a constraint to the CSPF algorithm. Various different constraints may be specified such as constraints related to end-to-end delay, maximum numbers of links/nodes traversed, maximum bandwidth required per link, costs associated with the links, nodes or links to be avoided, and the like.

As part of the processing, the CSPF algorithm initializes a list of nodes (referred to as Reverse Exclude list or "RE" list) to an empty list (step 206). The CSPF algorithm then identifies a next candidate node "N" for the path being computed (the CSPF path) from the PLR node to the merge point node that satisfies the set of constraints provided in 204 except for the CRE list constraint (step 208).

A check is then made to see if candidate node N identified in 208 is part of the RE list (step 210). If node N is determined in 210 to be part of the RE list, then that node N is rejected as a candidate for the CSPF path from the PLR to the merge point node (step 212) and processing reverts to step 208 wherein the CSPF algorithm identifies another candidate node N that satisfies the set of constraints provided in 204 except for the CRE list constraint.

If it is determined in 210 that node N is not part of the RE list, then a check is made to see if node N exists in the CRE list (step 214). Since the RE list is initialized to an empty list, for the first run of the processing depicted in FIG. 2 this check will indicate that node N is not part of RE. If it is determined in 214 that node N does not exist in the CRE list, then the node N is admitted in the CSPF path from the PLR node to the merge point node (step 216). Accordingly, in 216, the candidate node is selected as a node in the CSPF path from the PLR node to the merge point node. A check is then made to see if the path from the PLR node to the merge point node has been found (step 218). If it is determined in 218 that a path has been found from the PLR node to the merge point node then processing ends, else processing continues with step 208 wherein the CSPF algorithm identifies another candidate node N that satisfies the set of constraints provided in 204 except for the CRE list constraint.

Referring back to step 214, if it is determined that the CRE list contains node N, then all nodes downstream to node N in the CRE list are removed from the CRE list and added to list RE (step 220). Processing then continues with step 216. In this manner, processing continues until a path is determined from the PLR node to the merge point node. If no such path can be determined, then an error condition may be indicated.

Different CSPF techniques may be used to compute the CSPF such as Dijkstra's algorithm, and others. After a CSPF path has been computed, as described above, a local repair connection may be signaled from the PLR node to the merge point node using the CSPF path. The local repair connection may then be used to failover from the protected path. In embodiments where the failover has to occur in a limited timely manner, the local repair connection is generally set up in advance. For example, in one embodiment, using a preconfigured local repair connection, a switchover may be performed in less than 50 msec (milliseconds).

The processing depicted in FIG. 2 computes a path between a PLR node and a merge point node that satisfies constraints provided to the CSPF algorithm and does not traverse from a first node in the OPATH that is upstream from the PLR node in the OPATH to a second node in the OPATH that is upstream from the PLR node in the OPATH and downstream from the first node in the OPATH. The RE list represents a list of nodes in the OPATH that are upstream from the PLR node and downstream from the node selected to be in the CSPF path. A candidate node that is in the RE list is rejected, i.e., not selected to be in the CSPF path. This in turn ensures that, for nodes in the OPATH that are upstream from the PLR node, the resultant CSPF path does not traverse from one node to another node that is downstream from the one node in the OPATH. The RE list is dynamically updated every time a new node is included in the CSPF path. The CRE list is used to determine the nodes that are upstream to the PLR node and which can be included in the RE list.

In one embodiment, the above described technique is useful for determining a CSPF path from a PLR node to a merge point node in ring topology networks. Most metro networks are implemented using a ring network topology. In such networks, a node generally has only two interfaces or links to the network, one connecting the node to the previous node and another connecting the node to the next node. As a result, when a local repair connection path is to be computed, only one link is available, either the upstream link or the downstream link. By applying the techniques described above, the local repair connection path may be computed for ring network topologies using the upstream link and that meets the other constraints provided to the CSPF algorithm. A local repair connection may then be signaled using the computed CSPF path.

The processing performed by the flowchart depicted in FIG. 2 and described above may be explained using the network example depicted in FIG. 1. Let's assume that a local repair connection path is to be determined for a connection having an OPATH of N1-L1-N2-L2-N3-L3-N4-L4-N5-L5-N6-L6-N7. Further let's assume that node N4 is the PLR node for the path and node N7 is the merge point node for the path to be computed. Table A shown below depicts the progression of the flowchart 200 through various iterations until a CSPF path is found from N4 to N7.

TABLE A

Example showing application of processing depicted in FIG. 2

| # | CRE | RE | "N" | "N" in RE? | "N" in CRE? | Updated CRE | Updated RE | Admit/Reject |
|---|---|---|---|---|---|---|---|---|
| Initial | N1, N2, N3 | Empty | | | | | | |
| 1 | N1, N2, N3, | Empty | N3 | No | Yes | N1, N2, N3 | Empty | Admit N3 |
| 2 | N1, N2, N3 | Empty | N1 | No | Yes | N1 | N2, N3 | Admit N1 |
| 3 | N1 | N2, N3 | N2 | Yes | — | — | — | Reject N2 |
| 4 | N1 | N2, N3 | N8 | No | No | — | — | Admit N8 |
| 5 | N1 | N2, N3 | N2 | Yes | — | — | — | Reject N2 |
| 6 | N1 | N2, N3 | N9 | No | No | — | — | Admit N9 |
| 7 | N1 | N2, N3 | N7 | No | No | — | — | Admit N7 |

As depicted above in Table A, a CRE list is first initialized to include all nodes in the OPATH that are upstream from PLR node N4. This list includes {N1, N2, N3}. The ordering of the nodes in the OPATH is preserved in the CRE list. The RE list is initialized to be empty. The CSPF algorithm is then invoked with a set of constraints including the CRE.

During the first iteration (identified by the first column of Table A) of the algorithm, CRE={N1, N2, N3} (identified by second column of Table A) and RE={Empty} (identified by third column of Table A). Let's assume that the CSPF algorithm identifies node N3 as the candidate node (identified by the fourth column in Table A). Node N3 is determined to be not in RE (identified by the fifth column of Table A) since RE is empty at this stage. Node N3 is determined to be in CRE (identified by the sixth column of Table A). Accordingly, all the nodes in CRE that are downstream from N3 are removed from CRE and added to RE. This results in the updated RE list still being empty (identified by the eighth column in Table A) as there are no nodes in CRE that are downstream to node N3. CRE list also remains the same (identified by the seventh column in Table A). Node N3 is admitted to the CSPF path (identified by the ninth column in Table A). Since the CSPF path from PLR node N4 to merge point node N7 is not found, the processing continues with another iteration.

In the second iteration, CRE={N1, N2, N3} and RE={Empty}. Assuming that the CSPF algorithm then identifies node N1 as a CSPF candidate. Node N1 is not in RE but is in CRE. Accordingly, nodes N2 and N3 that are downstream to node N1 and are in CRE are removed from the CRE list and added to the RE list. Accordingly, the updated CRE={N1} and updated RE={N2, N3}. Node N1 is admitted to the CSPF path. Since the CSPF path from PLR node N4 to merge point node N7 is not found, the processing continues with another iteration.

In the third iteration, CRE={N1} and RE={N2, N3}. Assuming that the CSPF algorithm then identifies node N2 as a CSPF candidate. Node N2 is in RE and accordingly is rejected. Processing then continues with another iteration.

In the fourth iteration, CRE={N1} and RE={N2, N3}. Assuming that the CSPF algorithm then identifies node N8 as a CSPF candidate. Node N8 is not in RE or CRE. Accordingly, node N8 is admitted to the CSPF path. Since the CSPF path from PLR node N4 to merge point node N7 is not found, the processing continues with another iteration.

In the fifth iteration, CRE={N1} and RE={N2, N3}. Assuming that the CSPF algorithm then identifies node N2 as a CSPF candidate. Since node N2 is in RE, the node is rejected. Processing continues with another iteration.

In the sixth iteration, CRE={N1} and RE={N2, N3}. Assuming that the CSPF algorithm then identifies node N9 as a CSPF candidate. Node N9 is not in RE or CRE. Accordingly, node N9 is admitted to the CSPF path. Since the CSPF path from PLR node N4 to merge point node N7 is not found, the processing continues with another iteration.

In the seventh iteration, CRE={N1} and RE={N2, N3}. Assuming that the CSPF algorithm then identifies node N7 as a CSPF candidate. Node N7 is not in RE or CRE. Accordingly, node N7 is admitted to the CSPF path. Since the CSPF path from PLR node N4 to merge point node N7 is now found, the processing ends.

As a result of the processing, the CSPF path that is computed from PLR node N4 to merge point node N7 is N4-L3-N3-L7-N1-L9-N8-L10-N9-L11-N7. As can be seen, the computed path does not traverse from a first node in the OPATH that is upstream from the PLR node in the OPATH to a second node in the OPATH that is upstream from the PLR node in the OPATH and downstream from the first node in the OPATH. In this manner, an LPATH may be computed that traverses one or more upstream nodes from the PLR node in the OPATH but not in the same direction as the OPATH. For example, the computed LPATH may traverse from node N4 to N3 and from N3 to N1 but does not traverse from node N1 to N2 or N2 to N3 (i.e., in the same direction as the OPATH). This enhances the computation of the LPATH. A local repair connection may then be signaled using the computed path using known techniques. The local repair connection having an LPATH N4-L3-N3-L7-N1-L9-N8-LI0-N9-L1 I-N7 may then be used to protect the protected connection N1-L1-N2-L2-N3-L3-N4-L4-N5-L5-N6-L6-N7.

Figure 3:
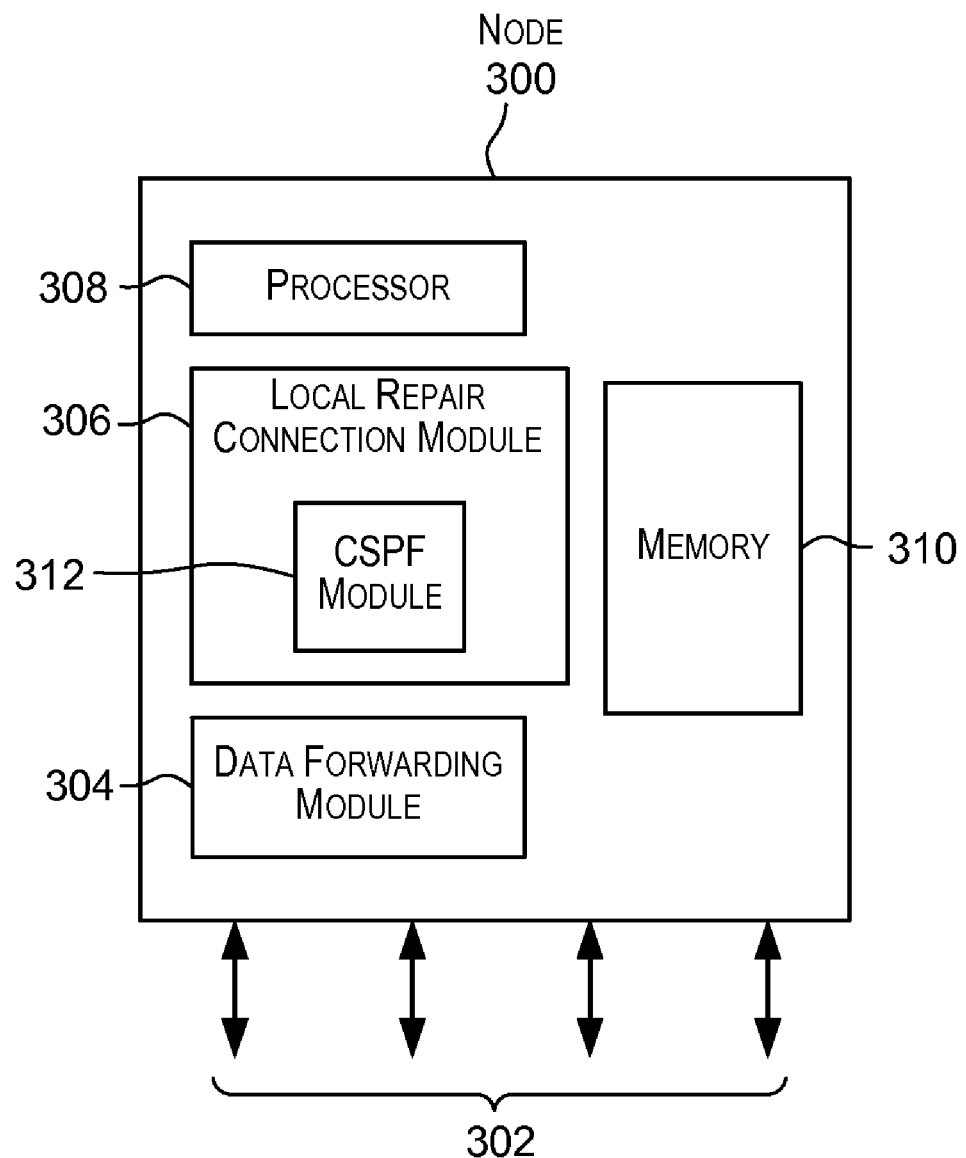
FIG. 3 is a simplified block diagram of a network node that may be used to practice an embodiment of the present invention.

FIG. 3 is a simplified block diagram of a network node 300 that may be used to practice an embodiment of the present invention. Node 300 may be embodied as a network node as depicted in FIG. 1. Node 300 may be a switch or router, such as routers and switches provided by Foundry Networks®, Inc. of Santa Clara, Calif.

As depicted in FIG. 3, node 300 comprises multiple physical ports 302, a data forwarding module 304, a local repair connection module 306, a processor 308, and memory 310. The modules may be implemented in software, hardware, or combinations thereof. Node 300 depicted in FIG. 3 illustrates a node incorporating an embodiment of the present invention and is not intended to limit the scope of the present invention. The structure of node 300 may be different in other embodiments of the present invention.

Node 300 receives data packets via one or more ports 302. The received data is then forwarded from node 300 to other links or nodes in the network via ports 302. Data forwarding module 304 is configured to perform processing to facilitate the forwarding of data packets received by node 300. As part of the processing, data forwarding module 304 may be configured to process a data packet received by node 300, determine a destination port of node 300 to which the packet is to be forwarded, and forward the packet to the determined destination port. Data forwarding module 304 may use information stored in memory 310 for data forwarding.

Data forwarding module 304 may comprise hardware, software components, or combinations thereof. In one embodiment, data forwarding module 304 comprises one or more line cards and a switching fabric. The line cards and switching fabric are used to forward data packets from one input port of node 300 to an output port of node 300. The hardware components may include ASICs, field programmable logic devices such as FPGAs, circuitry, and the like. The software components may include programs comprising code or instructions that are executed by processor 308 or by a processor within data forwarding module 304.

Data forwarding module 304 may also be configured to reroute data traffic for a protected connection along a local repair connection to protect a link and/or node of the protected connection. Information related to protected connections and their local repair connections and associated LPATHs may be stored in memory 310 and used by data forwarding module 304.

Local repair connection module 306 is configured to perform processing related to determining LPATHs and setting up local repair connections using the LPATHs. Local repair connection module 306 may comprise one or more modules including a CSPF module 312 that is configured to find a path from a PLR node to a merge point node using a CSPF algorithm in accordance with the teachings of the present invention. For example, module 312 may be configured to perform the processing depicted in FIG. 2 and described above. Information that is used by local repair connection module 306 or CSPF module 312 may be stored in memory 310.

The modules of local repair connection module 306 may comprise hardware components, software components, or combinations thereof. The hardware components may include ASICs, FPGAs, circuitry, and the like. The software components may include code or instructions that are executed by processor 308 or by processor within module 306. In one embodiment, module 306 may be part of module 304.

Processor 308 may execute software programs comprising code and instructions to perform various tasks. Processor 308 may also aid modules 306 and 304 in functions performed by those modules. In one embodiment, processor 308 may be configured to perform the functions performed by modules 304 and 306 such as data forwarding, determining CSPF paths, creation of local repair connections, and the like.

Memory 310 acts as a repository for storing data that is used by node 300. For example, memory 310 may store information related to various protected connections and local repair connections. Memory 310 may store network topology information that is used for determining local paths associated with local repair connections. For example, information regarding one or more OPATHs may be stored in memory 310 and the information used to determine LPATHs.

Memory 310 may also store programs comprising software code or instructions that are executed by processor 308 and/or by the other modules of node 300. For example, code or instructions which when executed by a processor cause the processor (or modules 304 and 306) to determine CSPF paths, as described above, may be stored in memory 310.

Processing according to the teachings of the present invention may be performed by a device, a system, or an apparatus in a networked or non-networked environment (i.e., standalone embodiment). The scope of the present invention as recited in the claims may be applied to any type of network protocol in which a path is determined between two network nodes using a CSPF algorithm. Various different CSPF algorithms may be used to compute the path. The computed path may then be used to signal a local repair connection.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method comprising:
   identifying, by a network device, for a connection having a first path traversing a plurality of nodes from an ingress node to an egress node, a start node and an end node from the plurality of nodes, wherein the end node is downstream to the start node in the first path; and
   determining, by the network device, a second path from the start node to the end node;
   wherein the determining comprises:
      identifying a first list of nodes comprising nodes in the first path that are upstream from the start node; and
      performing processing to ensure that the second path does not traverse a path from a first node in the first list to a second node in the first list wherein the second node is downstream from the first node in the first path;
   wherein performing processing comprises:
      determining if a first candidate node identified for inclusion in the second path is included in a second list of nodes;
      rejecting the first candidate node as a node for the second path upon determining that the first candidate node is included in the second list of nodes; and
      including the first candidate node as a node in the second path upon determining that the first candidate node is not included in the second list of nodes.

2. The method of claim 1 wherein determining the second path comprises determining the second path using a constraint shortest path first (CSPF) technique.

3. The method of claim 1 wherein performing processing further comprises, upon determining that the first candidate node is not included in the second list of nodes:
   determining if the first candidate node is included in the first list;
   if the first candidate node is included in the first list, identifying a set of nodes in the first list that are downstream from the first candidate node in the first path; and
   updating the second list to include the set of nodes.

4. The method of claim 3 wherein performing processing further comprises:
   determining if a second candidate node identified for inclusion in the second path is included in the updated second list of nodes;
   rejecting the second candidate node as a node for the second path upon determining that the second candidate node is included in the updated second list of nodes; and
   including the second candidate node as a node in the second path upon determining that the second candidate node is not included in the updated second list of nodes.

5. The method of claim 1 wherein the end node is at least two nodes downstream from the start node in the first path.

6. The method of claim 1 further comprising signaling a local repair connection using the second path.

7. The method of claim 1 wherein the second list of nodes comprises at least one node selected from the first list of nodes and inserted into the second list of nodes.

8. A system comprising:
   a memory configured to store information for a first path traversing a plurality of nodes from an ingress node to an egress node; and
   a processing module configured to:
      identify, for a second path, a start node from the plurality of nodes and an end node from the plurality of nodes, wherein the end node is downstream to the start node in the first path;
      identify a first list of nodes comprising nodes in the first path that are upstream from the start node; and
      perform processing to ensure that the second path does not traverse a path from a first node in the first list to a second node in the first list wherein the second node is downstream from the first node in the first path, the processing comprising:
         determining if a first candidate node identified for inclusion in the second path is included in a second list of nodes;
         rejecting the first candidate node as a node for the second path upon determining that the first candidate node is included in the second list of nodes; and
         including the first candidate node as a node in the second path upon determining that the first candidate node is not included in the second list of nodes.

9. The system of claim 8 wherein the processing module is configured to determine the second path using a constraint shortest path first (CSPF) technique.

10. The system of claim 8 wherein the processing module, upon determining that the first candidate node is not included in the second list of nodes, is configured to:
    determine if the first candidate node is included in the first list;
    if the first candidate node is included in the first list, identify a set of nodes in the first list that are downstream from the first candidate node in the first path; and
    update the second list to include the set of nodes.

11. The system of claim 10 wherein the processing module is configured to:
    determine if a second candidate node identified for inclusion in the second path is included in the updated second list of nodes;
    reject the second candidate node as a node for the second path upon determining that the second candidate node is included in the updated second list of nodes; and
    include the second candidate node as a node in the second path upon determining that the second candidate node is not included in the updated second list of nodes.

12. The system of claim 8 wherein the end node is at least two nodes downstream from the start node in the first path.

13. The system of claim 8 wherein the processing module is configured to signal a local repair connection using the second path.

14. The system of claim 8 wherein the second list of nodes comprises at least one node selected from the first list of nodes and inserted into the second list of nodes.

15. A computer-readable memory storing a plurality of instructions for controlling a processor to determine a local repair path for a connection, the connection having a first path traversing a plurality of nodes from an ingress node to an egress node, the plurality of instructions comprising:
    instructions that cause the processor to identify a start node and an end node from the plurality of nodes, wherein the end node is downstream to the start node in the first path; and
    instructions that cause the processor to determine a second path from the start node to the end node;
    wherein the instructions that cause the processor to determine the second path comprise:
       instructions that cause the processor to identify a first list of nodes comprising nodes in the first path that are upstream from the start node; and
       instructions that cause the processor to perform processing to ensure that the second path does not traverse a path from a first node in the first list to a second node in the first list wherein the second node is downstream from the first node in the first path;
    wherein the instructions that cause the processor to perform processing to ensure that the second path does not traverse a path from a first node in the first list to a second node in the first list comprise:
       instructions that cause the processor to determine if a first candidate node identified for inclusion in the second path is included in a second list of nodes;
       instructions that cause the processor to reject the first candidate node as a node for the second path upon determining that the first candidate node is included in the second list of nodes; and
       instructions that cause the processor to include the first candidate node as a node in the second path upon determining that the first candidate node is not included in the second list of nodes.

16. The computer-readable memory of claim 15 wherein the instructions that cause the processor to determine the second path comprise instructions that cause the processor to determine the second path using a constraint shortest path first (CSPF) technique.

17. The computer-readable memory of claim 15 wherein the instructions that cause the processor to perform processing comprise instructions that cause the processor to, upon determining that the first candidate node is not included in the second list of nodes:
    determine if the first candidate node is included in the first list;
    if the first candidate node is included in the first list, identify a set of nodes in the first list that are downstream from the first candidate node in the first path; and
    update the second list to include the set of nodes.

18. The computer-readable memory of claim 17 wherein the instructions that cause the processor to perform processing further comprise:
    instructions that cause the processor to determine if a second candidate node identified for inclusion in the second path is included in the updated second list of nodes;

instructions that cause the processor to reject the second candidate node as a node for the second path upon determining that the second candidate node is included in the updated second list of nodes; and instructions that cause the processor to include the second candidate node as a node in the second path upon determining that the second candidate node is not included in the updated second list of nodes.

19. The computer-readable memory of claim 15 wherein the end node is at least two nodes downstream from the start node in the first path.

20. The computer-readable memory of claim 15 wherein the plurality of instructions further comprises instructions that cause the processor to signal a local repair connection using the second path.

21. The computer-readable memory of claim 15 wherein the second list of nodes comprises at least one node selected from the first list of nodes and inserted into the second list of nodes.

22. A method comprising:
   determining, by a network device, a second path from a start node to an end node, wherein the start and end nodes are from a plurality of nodes traversed by a first path and the end node is downstream from the start node in the first path; and
   wherein the determining comprises:
      identifying a first node included in the second path, wherein the first node is in the first path and is upstream from the start node in the first path; and
      performing processing to ensure that the second path does not traverse a path from the first node to a second node in the plurality of nodes wherein the second node is upstream from the start node in the first path and the second node is downstream from the first node in the first path, the processing comprising:
         determining if a first candidate node identified for inclusion in the second path is included in a second list of nodes;
         rejecting the first candidate node as a node for the second path upon determining that the first candidate node is included in the second list of nodes; and
         including the first candidate node as a node in the second path upon determining that the first candidate node is not included in the second list of nodes.

23. A system comprising:
a memory configured to store information for a first path traversing a plurality of nodes; and
a processing module configured to:
   determine, for a second path, a start node and an end node, wherein the start and end nodes are from the plurality of nodes and the end node is downstream from the start node in the first path;
   identify a first node included in the second path, wherein the first node is in the first path and is upstream from the start node in the first path; and
   perform processing to ensure that the second path does not traverse a path from the first node to a second node in the plurality of nodes wherein the second node is upstream from the start node in the first path and the second node is downstream from the first node in the first path, the processing comprising:
      determining if a first candidate node identified for inclusion in the second path is included in a second list of nodes;
      rejecting the first candidate node as a node for the second path upon determining that the first candidate node is included in the second list of nodes; and
      including the first candidate node as a node in the second path upon determining that the first candidate node is not included in the second list of nodes.

* * * * *